United States Patent
Akama et al.

(10) Patent No.: US 11,277,362 B2
(45) Date of Patent: Mar. 15, 2022

(54) CONTENT POST DELAY SYSTEM AND METHOD THEREOF

(71) Applicant: Honda Motor Co., Ltd., Tokyo (JP)

(72) Inventors: Shinichi Akama, Cupertino, CA (US); Shigeyuki Seko, Campbell, CA (US)

(73) Assignee: Honda Motor Co., Ltd., Tokyo (JP)

(*) Notice: Subject to any disclaimer, the term of this patent is extended or adjusted under 35 U.S.C. 154(b) by 268 days.

(21) Appl. No.: 16/042,923

(22) Filed: Jul. 23, 2018

(65) Prior Publication Data

US 2020/0028807 A1    Jan. 23, 2020

(51) Int. Cl.
*H04L 51/046* (2022.01)
*G06N 3/08* (2006.01)
*H04L 51/42* (2022.01)
*G06F 40/20* (2020.01)

(52) U.S. Cl.
CPC ............ *H04L 51/046* (2013.01); *G06F 40/20* (2020.01); *G06N 3/08* (2013.01); *H04L 51/22* (2013.01)

(58) Field of Classification Search
CPC ......... H04L 51/046; H04L 51/22; G06N 3/08; G06F 17/27; G06F 40/20
See application file for complete search history.

(56) References Cited

U.S. PATENT DOCUMENTS

| | | | | |
|---|---|---|---|---|
| 8,041,344 B1* | 10/2011 | Coughlan | ............... | H04L 51/12 455/414.1 |
| 9,402,576 B2* | 8/2016 | Kanevsky | ............... | A61B 5/165 |
| 9,444,647 B2* | 9/2016 | Cunningham | ...... | H04L 63/1408 |
| 10,108,703 B2* | 10/2018 | Barsness | ................. | H04L 51/04 |
| 10,484,320 B2* | 11/2019 | Bastide | .................. | H04L 51/046 |
| 10,594,638 B2* | 3/2020 | Bostick | ................... | H04L 51/10 |
| 2005/0228996 A1* | 10/2005 | Mayer | ................... | H04L 63/126 713/170 |
| 2009/0110246 A1* | 4/2009 | Olsson | ............. | H04M 1/72427 382/118 |
| 2009/0177673 A1* | 7/2009 | Cunningham | ......... | H04L 51/12 |
| 2010/0141845 A1* | 6/2010 | Kikkawa | ................ | G09G 5/003 348/706 |
| 2012/0297316 A1* | 11/2012 | Ercegovic | ............ | G06Q 10/107 715/752 |
| 2014/0068007 A1* | 3/2014 | O'Gorman | ............... | H04N 7/15 709/219 |

(Continued)

FOREIGN PATENT DOCUMENTS

JP    20180010570 A    1/2018

*Primary Examiner* — Sargon N Nano
(74) *Attorney, Agent, or Firm* — American Honda Motor Co., Inc.; Aaron Fong (57) ABSTRACT

The present disclosure relates to delaying content from being sent when it is determined to be inappropriate. Inappropriate content may be determined by keywords within the content, speed at which the content is entered in, facial expression of a sender who is entering in the content or the like. A sent message confirming that the content has been delivered to a receiver device may be provided to a sender device when the content has been held. This may provide a cool down period for the sender. After a period of time, the content may be provided back to the sender indicating that the content has not been sent. If approved or revised, the content may be sent to the receiver device. Otherwise, sending the content may be cancelled.

22 Claims, 8 Drawing Sheets

(56) References Cited

U.S. PATENT DOCUMENTS

| | | | |
|---|---|---|---|
| 2014/0074943 A1* | 3/2014 | Kanevsky | G06Q 50/01 |
| | | | 709/206 |
| 2014/0192134 A1* | 7/2014 | Jung | H04L 12/1827 |
| | | | 348/14.02 |
| 2015/0195232 A1* | 7/2015 | Haugen | H04L 51/18 |
| | | | 709/206 |
| 2016/0063874 A1* | 3/2016 | Czerwinski | G06F 40/166 |
| | | | 434/236 |
| 2016/0127641 A1* | 5/2016 | Gove | G06F 3/01 |
| | | | 348/143 |
| 2016/0294755 A1* | 10/2016 | Prabhu | H04L 51/12 |
| 2016/0350644 A1 | 12/2016 | Devarajan et al. | |
| 2018/0026920 A1* | 1/2018 | Chen | H04L 51/04 |
| | | | 455/466 |
| 2018/0089310 A1* | 3/2018 | Barsness | H04L 51/04 |
| 2018/0331990 A1* | 11/2018 | Bastide | H04L 51/063 |
| 2020/0014644 A1* | 1/2020 | Bastide | H04L 51/32 |
| 2020/0065612 A1* | 2/2020 | Xu | G06N 3/084 |
| 2020/0092238 A1* | 3/2020 | Bostick | H04L 51/18 |
| 2020/0098283 A1* | 3/2020 | Vaculin | G09B 17/006 |
| 2020/0274839 A1* | 8/2020 | Loi | H04L 67/22 |

\* cited by examiner

CONTENT POST DELAY SYSTEM AND METHOD THEREOF

BACKGROUND

Text messages, or other type of content, may be a brief, electronic message sent between two or more computing devices. These messages may include alphabetic and numeric characters, between two or more users of mobile phones, tablets, desktops/laptops or other devices. Short message service (SMS) and multimedia messaging service (MMS) may be used to provide the text messages from the computing devices over a cellular network or an Internet connection. Advantageously, the text messages may allow discrete phone conversations by removing the "voice" component. Text messages may also be less time consuming to generate such that conversations flow like a typical call. Store-and-forward services may be used such that a receiver of the messages does not have to be connected to the cellular network or the Internet connection.

However, many users may find that the advantages of the text messages may also be disadvantages. For example, the text messages may be sent in a heated conversation. These users may often regret the moment that the text messages are sent. Derogatory names, or emotionally charged words, may be sent by text messages leading to lost or broken friendships and other relationships. In the past, and to lessen these messages, the user may have sent a quick apologetic message and hope that the receiver may forget it. These may be oftentimes ineffective.

Figure 1:
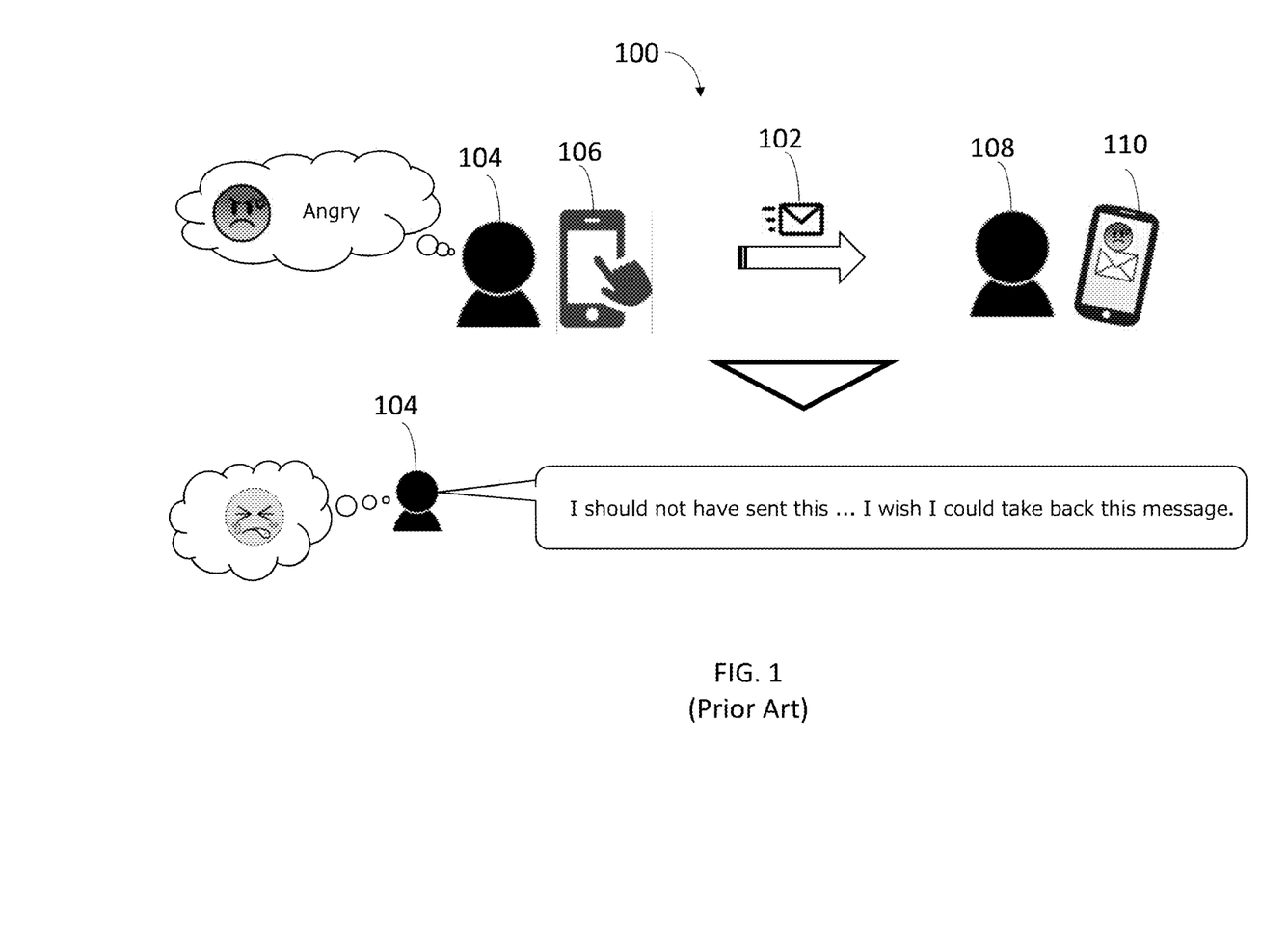
FIG. 1 is a schematic diagram of a prior art scenario where content is provided from a sender to a receiver without a content post delay system in accordance with one aspect of the present disclosure.

Turning to FIG. 1, a schematic diagram of a prior art scenario 100 where content 102 is provided from a sender 104 to a receiver 106 without a content post delay system in accordance with one aspect of the present disclosure is shown. The content 102 may include but is not limited to email, text messages, or the like. Other types of content 102 may be exchanged and is not limited to that shown.

While a single sender device 106 is shown as providing content 102 to a single receiver device 110, this scenario 100, as well as other scenarios presented herein, may be modified to include additional components, and is not necessarily limited to that shown. For example, the sender device 106 may provide content 102 to multiple receiver devices 110. Receiver devices 110 may also become sender devices 106. In addition, group conversations may occur between multiple sender devices 106 and receiver devices 110.

Without the content post delay system as provided in the prior art scenario 100, however, the content 102 exchanged between the senders 104 and receivers 108 may result in sending straight-forward content 102. For example, the sender 104, through their sender device 106, may provide content 102 when they are angry. The content 102 may thus be immediately received by the receiver 108 causing a shock. Unfortunately, this may lead to hurt feelings or damaged relationships based on the content 102 that was sent by the sender 104 and received by the receiver 108.

After the content 102 has been sent, the sender 104 may have regrets as shown in the scenario 100. Unfortunately, and without the content post delay system, which will be described below, the receiver's feelings may have been hurt. Friendships or relationships may have been damaged and may in some instances be irreparable.

The present disclosure provides for a content post delay system and method thereof that addresses the above identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a computing device is provided. The device may include an input device, an output device, at least one processor and a memory operatively coupled to the processor, the memory storing program instructions that when executed by the processor, causes the processor to perform processes. These processes may include receiving content from the input device, holding the content for a period of time when the content is inappropriate, displaying a sending complete message on the output device associated with the content received from the input device when the content is held displaying the content on the output device after holding the content, displaying the content for editing and sending the content if approved.

In accordance with another aspect of the present disclosure, a method of preventing content from being sent to a receiver device from a sender device is provided. The method may include receiving content from the sender device, holding the content for a period of time when the content is inappropriate, providing to the sender device a sent message confirmation when the content is held, providing to the sender device the content after holding the content, requesting from the sender device to approve or edit the content and sending the content to the receiver device if approved or edited by the sender device.

In accordance with yet another aspect of the present disclosure, a system is provided. The system may include a sender device for providing content. In addition, the system may include a message server for receiving the content and holding the content for a period of time when the content is inappropriate, wherein the message server provides a sending complete message to the sender device when the content is held and after the period of time, sends the content back to the sender device, the message server requesting from the sender device to approve sending the content and sending the content if approved.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 6 is a schematic diagram of an illustrative scenario where content is flagged or marked and sent as the content is urgent in accordance with one aspect of the present disclosure;

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to delaying content 102, such as text messages or emails, from being sent when the content 102 is determined to be inappropriate. More particularly, a content post delay system and method thereof is described that may hold or retain the inappropriate content 102 and allow the content 102 to be reviewed or modified before being sent or cancelled after a period of time has elapsed. In an illustrative embodiment, the system may receive the content 102 from a sender device 106 and hold the content 102 for the period of time when the content 102 is determined to be inappropriate. Inappropriate content 102 may be determined by keywords within the content 102, speed at which the content 102 is entered in or facial expression of a sender 104 who is entering in the content 102, for example. A sent message confirming that the content 102 has been delivered to a receiver device 110 may be provided to a sender device 106 when the content 102 has been held. This may provide a cool down period for the sender 104. After the period of time, the content 102 may be provided back to the sender 104 indicating that the content 102 has not been sent and was held due to its content 102. Revisions to the content 102 may be suggested or the content 102 may be approved. If approved or revised, the content 102 may be sent to the receiver device 110. Otherwise, the content 102 may be cancelled.

Numerous other modifications or configurations to the content post delay system and method thereof will become apparent from the description provided below. For example, while text messages or emails are shown as being held, other forms of communications may be retained, such as voicemails, pictures, graphics, or the like. Advantageously, heated conversations may be dissipated by adding time delays. Furthermore, the sender 104 may be able to rethink and evaluate what they have written without the emotional state in which the original communication was drafted. Other advantages will become apparent from the description provided below.

Figure 2:
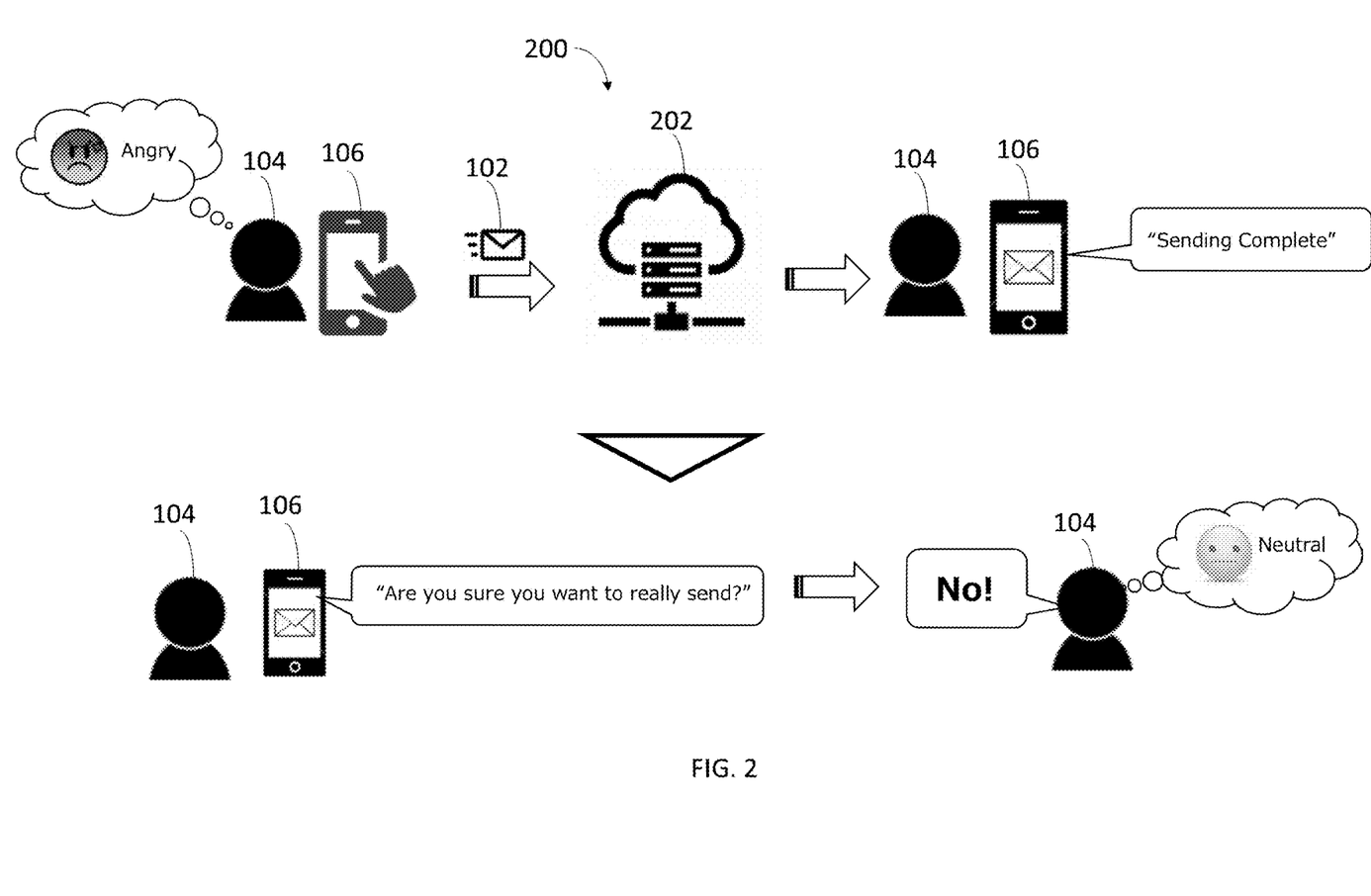
FIG. 2 is a schematic diagram of an illustrative scenario where content is provided from the sender to the receiver with the content post delay system in accordance with one aspect of the present disclosure.

Turning to FIG. 2, a schematic diagram of an illustrative scenario 200 where content 102 is provided from the sender 104 to the receiver 108 with the content post delay system 202 in accordance with one aspect of the present disclosure is provided. The content 102 may be sent by the sender 104 from their sender device 106 when their emotional state is angry. The sender 104 may provide the content 102 through their voice or touchpad input into the sender device 106.

The content post delay system 202 may receive the content 102 from the sender device 106. The system 202 may operate on a server and may be used to judge or evaluate the content 102 to determine whether the content 102 provided by the sender 104 is inappropriate. A mail service provider may also judge or evaluate the content 102 sent between the sender 104 or receiver 106. Other systems may be included that deliver content 102, for example, a social networking service (SNS) application, online news where posts are allowed, blogs, bulletin board system, or the like.

A number of different factors may be used to determine the appropriateness of the content 102 which will be provided below. This system 202 may then hold the content 102 or pass it to the receiver 108 depending on whether the content 102 was found to be inappropriate.

To determine whether the content 102 of the sender 104 is inappropriate, the content post delay system 202 may evaluate keywords within the content 102. Keywords that may be checked are those that are related to emotions, for example, when the sender 104 is angry or upset. Keywords associated with these emotions may be, for example, "hate" or "mad" and these may be found as inappropriate.

Derogatory keywords may also be reviewed and flagged by the system 202 as inappropriate. Some of these words may have racially insensitive overtones that may be flagged or marked. Curse words may also be keywords that the system 202 marks as inappropriate. Other keywords that may be established as inappropriate are those that are conveyed as acronyms or abbreviations. In one embodiment, a database or dictionary of keywords may be used by the system 202. These keywords may be matched with the content 102. When a match is made, the content 102 may be marked or flagged as inappropriate.

In one embodiment, machine learning may be used to determine which types of keywords are inappropriate. Keywords within the received content 102 may themselves not be flagged initially as they do not fall under those categories described above. Keywords may begin to be flagged after conversations end abruptly. For example, if conversations end abruptly after discussing "money", the machine learning algorithm may flag that keyword as inappropriate. Content 102 with the keyword "money" may then be held.

In one embodiment, the content 102 may be flagged as inappropriate if words within the content 102 are all in capital letters, i.e., caps. The capital letters for the word may indicate an expression of anger or frustration. In one example, the statement, "I will NOT go with you", may be flagged as inappropriate due to the capital letters emphasized in the word "NOT".

Previous content 102, such as email or text messages, may also be evaluated to determine whether the content 102 is inappropriate. For purposes of illustration, the sender 104 may provide content 102 about an upcoming birthday party. The receiver 108 may indicate that they may not be able to attend the birthday party. Unfortunately, the conversation may start going downhill from there. The sender may then provide a text message of "We will never go to your birthday parties then". Based on the previous exchanges, the content post delay system 202 may judge the content 102 as inappropriate and hold the content 102 before being sent. Keyword matching may have not flagged the content 102 as described earlier, however, based on the previous conversations, it may now be marked or flagged.

As shown above, the content 102 may be judged by keywords within the content. Additionally, an emotional state of the sender 104 may be captured to evaluate those keywords to determine whether the content 102 is inappropriate. Keywords that may not be flagged in a typical routine may now be marked as inappropriate when the sender's emotional state is taken into account.

To achieve this, a camera on the sender device 106 may be used to detect the sender's emotional state. The sender's face may be scanned, for example, while they are drafting the message. By matching facial expressions with emotional states, the sender's emotional state may be determined. Facial expressions that may be detected, for example, are whether the sender 104 is angry, mad, sad or the like. Facial colors may also be detected, for example, if the sender 104 is getting a reddish color on their face, this may indicate that they are mad or angry.

Facial emotional detections may be made by a variety of sender devices 106. The sender device 106 may be, for example, a smartphone or personal computer. This information may be sent from the sender device 106 to the content post delay system 202 to determine the sender's emotion or may be handled on the sender device 106 itself.

Other alternatives for detecting the sender's emotions may be used. For example, biometric scanners associated with the sender device 106 may be used. In one example, moisture from a sender's hand may be detected. This moisture may indicate that the sender 104 is upset and the content 102 being provided may be inappropriate. The content 102 may be judged with the emotional state. Keywords may be given a higher emotional value if the sender 104 was detected with an emotion such as angry or mad. For example, "I will not go with you" may be judged as inappropriate if the sender's emotional state is angry.

Accelerometers or gyroscopes on the sender device 106 may be used to detect the sender's emotional state as well. In one example, the emotional state of the sender 104 may be determined if the hand of the sender 104 is shaking rapidly, which may be picked up the accelerometers or gyroscopes. This shaking or movement of the sender device 106 may also indicate the sender's inattention to what they are drafting. The sender 104 may be inattentive and the content 102 may be inappropriate as it may not have been properly reviewed before being sent.

In one embodiment, and in accordance with other information that may be provided by the sender device 106 to the content post delay system 202, global positioning system (GPS) information may be used to determine the emotional state of the sender 104, and thus the appropriateness of the content 102. The GPS information may indicate that the sender 104 is in an emergency as the sender device 106 is moving from one location to another location rapidly. When such an emotion has been determined, the content 102 that is sent may be marked or flagged as urgent. Content 102 that is labelled as urgent may be used to override holding it.

While the emotional state from the sender 104 may be used to determine whether keywords within the content 102 is inappropriate, the emotional state itself may be used by the content post delay system 202. This information may be determinative of any content 102 that is being sent and the content 102 may be flagged to be held by the system 202. That is, even if the content 102 is deemed to be appropriate, it may still be withheld.

Other information that may be used to determine whether the content 102 between the sender 104 and the receiver 108 is inappropriate may be previous relationship information between the sender 104 and the receiver 108. For example, if there is a "sore" topic between the sender 104 and the receiver 108, the content 102 may be held by the content post delay system 202. Messages that include this topic may be held, re-evaluated, edited, sent, or cancelled when the content 102 is held by the system 202.

Continuing, with the scenario 200 in FIG. 2, and if the content 102 has been judged inappropriate, the content 102 may be held at the content post delay system 202. During this time, the sender device 106 may display "Sending Complete". This message may be provide by the system 202. The display may indicate that the message has been sent, but actually or in reality, the content 102 may be pending within the system 202, and has not been sent to the receiver 108 to their receiver device 110.

The period of time for holding the content 102 may be based on an appropriate time for giving the sender 104 the impression that the content 102 has been sent, but providing doubt or regret about sending the content 104. This may be a predetermined threshold such as thirty (30) seconds, for example.

Alternatively, the period of time for which the content 102 is held may depend on the emotional state of the sender 104 and may vary on that sender's disposition. For example, when the sender 104 is slightly annoyed, the content 102 may be held for ten (10) seconds while an emotional state of extreme anger may be used to hold the content 102 for thirty (30) seconds. Continuously checking the sender's emotional state through information provided by the sender device 106, may be used such that if the sender 104 has not calmed down, the content 102 may be still held. Only until the sender's emotional state has calmed down may the content 102 be sent.

In one embodiment, the period of time the content 102 is held depends on the content 102 itself. Stronger keywords that may indicate the tone of the content 102 may be determinative to hold the content 102 longer. For example, if the keyword "hate" is found within the content 102, the content 102 may be held an additional five (5) seconds longer. Curse words, or other keywords that were shown above, may be used by the content post delay system 202 to increase or decrease the period of time.

The period of time for the content 102 to be held may be reflective of when the sender 104 calms down. By "tricking" the sender 104 into thinking they have sent the content 102, the emotional state of the sender 104 may settle down. After this doubt or regret, the sender 104 may edit, send or cancel the content 102. In one illustration, a message on the sender device 106 may provide editing options or confirmation whether the content 102 should be sent after the period of time. In one example, the display may provide "Are you sure you really want to send?". A prompt may request information from the sender 104 either through a message or voice suggestion.

If the sender 104 provides through their device 106, that the content 102 should not be sent, the content 102 may be cancelled. In one embodiment, the holding of the content 102 may be continued until the sender's emotions have calmed down. If within a period of time, the sender 104 has not calmed down, the content 102 may be cancelled altogether.

Figure 3:
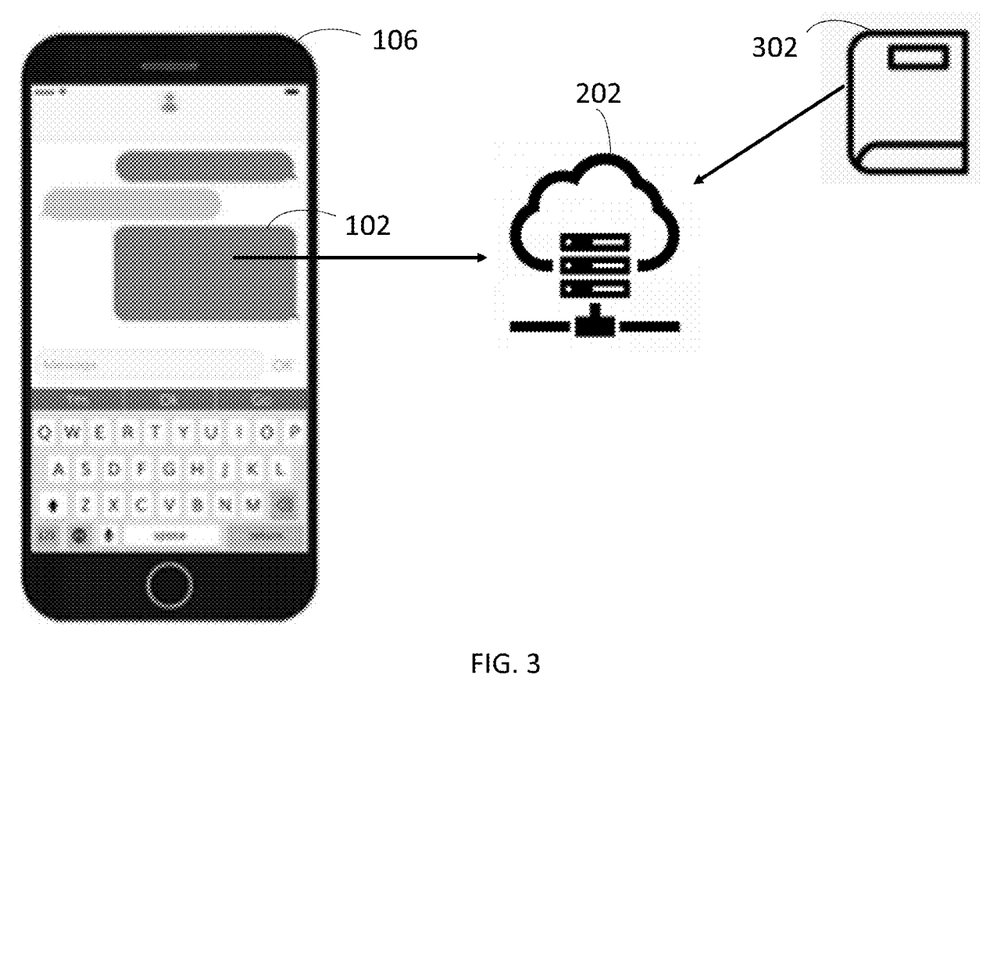
FIG. 3 is a schematic diagram of an illustrative content post delay system flagging content for holding in accordance with one aspect of the present disclosure.

Turning to FIG. 3, a schematic diagram of the illustrative content post delay system 202 flagging content 102 for holding in accordance with one aspect of the present disclosure is provided. The content 102 may be from an instant message service. Instant messages may be short messages that may be transmitted between the sender device 106 to the receiver device 110. The content 102 may be composed on a lower portion of the sender device 106. The content 102 may then be sent by selecting a "send" function.

After pressing or actuating the send function, the content 102 may be provided to the content post delay system 202. The system 202 may determine whether the content 102 is inappropriate. A dictionary 302 may be used to match keywords found in the content 102. When a match is made, the content 102 may be flagged or marked as inappropriate.

As shown, and discussed earlier, the text content as well as facial expressions acquired by the camera when typing may be used to determine whether the content 102 is inappropriate. Furthermore, the speed at which the content 102 is provided may be an indicator of whether the content 102 is inappropriate. The speed may indicate that the sender 104, and possibly the receiver 108, are not properly reviewing their content 102. Alternatively, the speed may indicate that the sender 104 and receiver 108 are making hasty comments or texts and the exchange of the content 102 should be slowed down.

Figure 4:
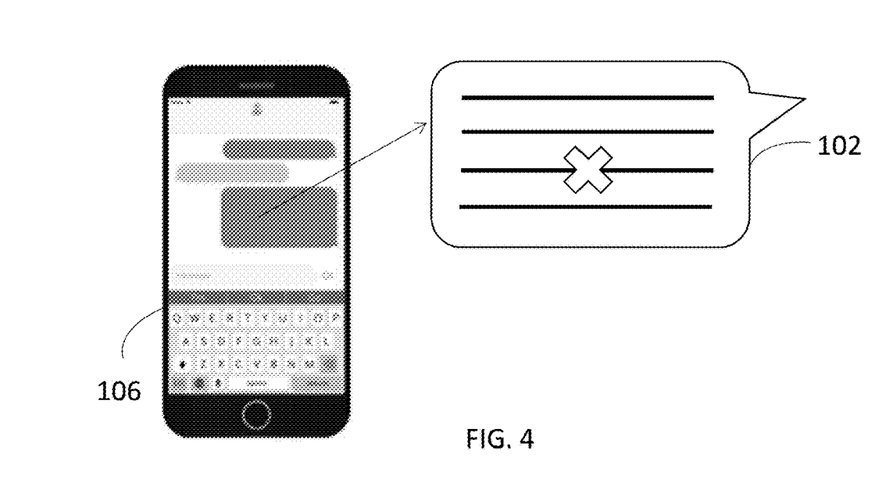
FIG. 4 is a schematic diagram of illustrative content flagged for holding in according with one aspect of the present disclosure.

If inappropriate, the content 102 may be flagged or marked for holding on the content post delay system 202. The sender device 106 may show that the content 102 has been sent, although it has not been. FIG. 4 is a schematic diagram of illustrative content 102 flagged for holding in according with one aspect of the present disclosure. The content 102 may be displayed on the sender device 106 but not actually sent even though a "Send Completed" messages has been provided. The content 102, as indicated by the "X" may be flagged or marked as inappropriate, as described above.

Figure 5:
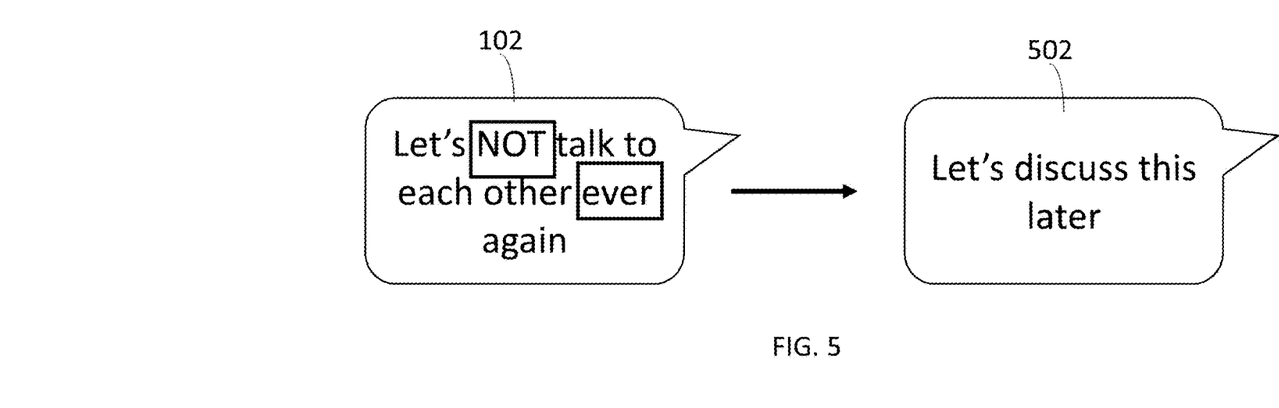
FIG. 5 is a schematic diagram of illustrative content flagged for holding and proposed revised content for sending in according with one aspect of the present disclosure.

With the content 102 being marked or flagged, the content post delay system 202 may provide suggestions or edits to the content 102 to make it more appropriate. FIG. 5 is a schematic diagram of illustrative content 102 flagged for holding and proposed revised content 502 for sending in according with one aspect of the present disclosure. In a heated argument, the sender 104 may provide a message as "Let's NOT talk to each other ever again."

The system 202 may identify keywords, in this particular content 102, that may be inappropriate. To achieve this, the dictionary 302 may be used for matching keywords within the content 102. One keyword may be noted as in all caps, i.e., "NOT". Another keyword "ever" may be flagged or marked by the system 202. In combination, the system 202 may note that this content is inappropriate. Other illustrations may exist and this should not be construed as limiting. As described above, more than keywords be may used, for example, the emotional state may be provided directly by the sender device 106 to determine whether the incoming content 102 is inappropriate.

The content post delay system 202 may provide suggestions to amend or change the content 102 that was sent. The revised content 502, when generated, may include the same features as the original content 102, however, toned down. Words may be replaced with softer versions of those words. That is, a word such as "hate" may be removed and replaced with "do not like".

In one illustrative embodiment, and through a neural network, sentences may be modified to include toned down revised content 502. The neural network, for purposes of the present disclosure, may be used for solving artificial intelligence problems. The neural network may use examples to automatically infer rules for recognizing words and sentences. The neural network may then replace them with toned down words and sentences. By increasing the number of training samples, the network may learn more about the inappropriate keywords. The neural network may be trained to learn relevant characteristics of a sentence that may be flagged and then how to overcome those issues within the sentence. These keyword classifications may then be used by the neural network to generate wholly and entirely new sentences, or portions thereof.

In the illustration, the word "Let's" may be kept the same between the content 102 and the revised content 502. However, due to keyword recognitions that may be spotted by the neural network, a new sentence may be formed and toned down such that the revised content 502 may be sent to the sender device 106 after the period of time for holding the content 102 has passed. The revised content 502 may provide the sentence "Let's discuss this later.", instead of the much harsher language of "Let's NOT talk to each other ever again".

In one embodiment, the revised content 502 may be generated by simple word replacements. For example, the keyword "ever" may be toned down in the revised content 502 as "later". The other keywords may be used to get the context of the content 102. A sentence may then be formulated using this context. That is, "talk" may be toned down into the word "discussion" and "ever again" may be toned to later. Sentence reconstruction may then take place and performed by the system 202 to make a coherent sentence using these revisions.

While only one sentence was proposed in the revised content 502, multiple suggestions may be made. Furthermore, the sender 104 may themselves be able to revise their own content through the same instant messaging application that they sent the original content 102. The content 102 may be provided back onto the content generation portion where the sender 104 may backspace or scroll into the area where the content 102 is to be revised. The content 102 may then be sent again. Typically, after the revised content 502 has been displayed, the content post delay system 202 does not hold the content 102 from being sent to the receiver device 110. Thus, the sender 104 may be able to send their original content 102, send revised content 502 suggested by the system 202, revise the original content 102 and then send or cancel content 102 altogether without any revisions.

Figure 6:
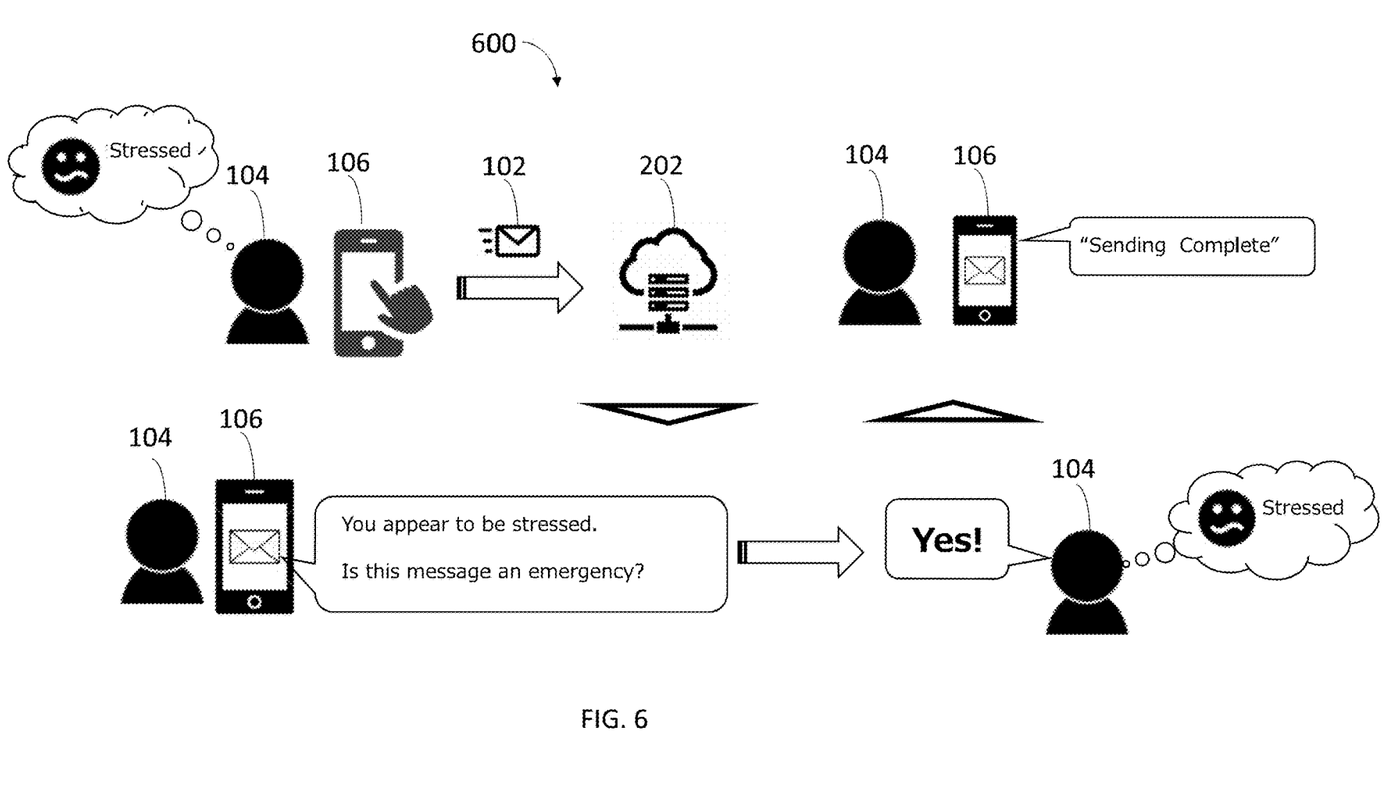
FIG. 6 is a schematic diagram of illustrative content flagged for holding and a plan for dealing with urgent content in according with one aspect of the present disclosure.

In some instances, the content 102 may be sent regardless of whether it is found to be inappropriate. FIG. 6 is a schematic diagram of an illustrative scenario 600 where content 102 is flagged or marked and sent as the content 102 is urgent in accordance with one aspect of the present disclosure. The scenario 600 is similar to those presented above, however, with the addition of sending urgent content 102 with consent.

The sender 104 may provide their content 102 through their sender device 106 to the content post delay system 202. The system 202 may then identify that the content 102 is inappropriate, as described above. In turn, the system 202 may send a "Sending Complete" message to the sender device 106, which would indicate on the device 106 that the content 102 has been sent. Actually or in reality, the content 102 has not been sent and would be held up in the system 202.

Content 102, however, that may reflect urgency may be flagged or marked. The urgency may be reflected in keywords found within the content 102. Urgency may also be reflected through the emotional state as detected by the sender device 106. This information, or in combination with keywords found within the content 102, may be used to detect the urgency of the content 102.

After recognition and before or after the content 102 gets held for the predetermined amount of time, the system 202 may provide a message such as "You appear to be stressed. Is this message an emergency?". If the sender 104 responds back that this content 102 is indeed an urgent message, then the content 102 may be provided to the receiver device 110 and the receiver 108 may be able to see it. When the conversation has been labeled as urgent, no other content 102 may be held for this conversation.

Figure 7:
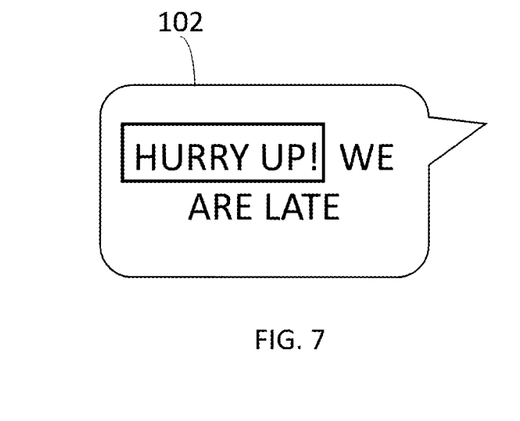
FIG. 7 is a schematic diagram of illustrative content marked or flagged for urgency in according with one aspect of the present disclosure.

FIG. 7 is a schematic diagram of illustrative content 102 marked or flagged for urgency in according with one aspect of the present disclosure. The keywords "Hurry Up" may be flagged as relating to urgency. The rush or haste found in the keywords of this content 102 may be seen as inappropriate. On the other hand, the keywords "Hurry Up" indicates that this content 102 may be urgent and the prompt of "You appear to be stressed. Is this message an emergency?" may be shown on the sender device 106.

Figure 8:
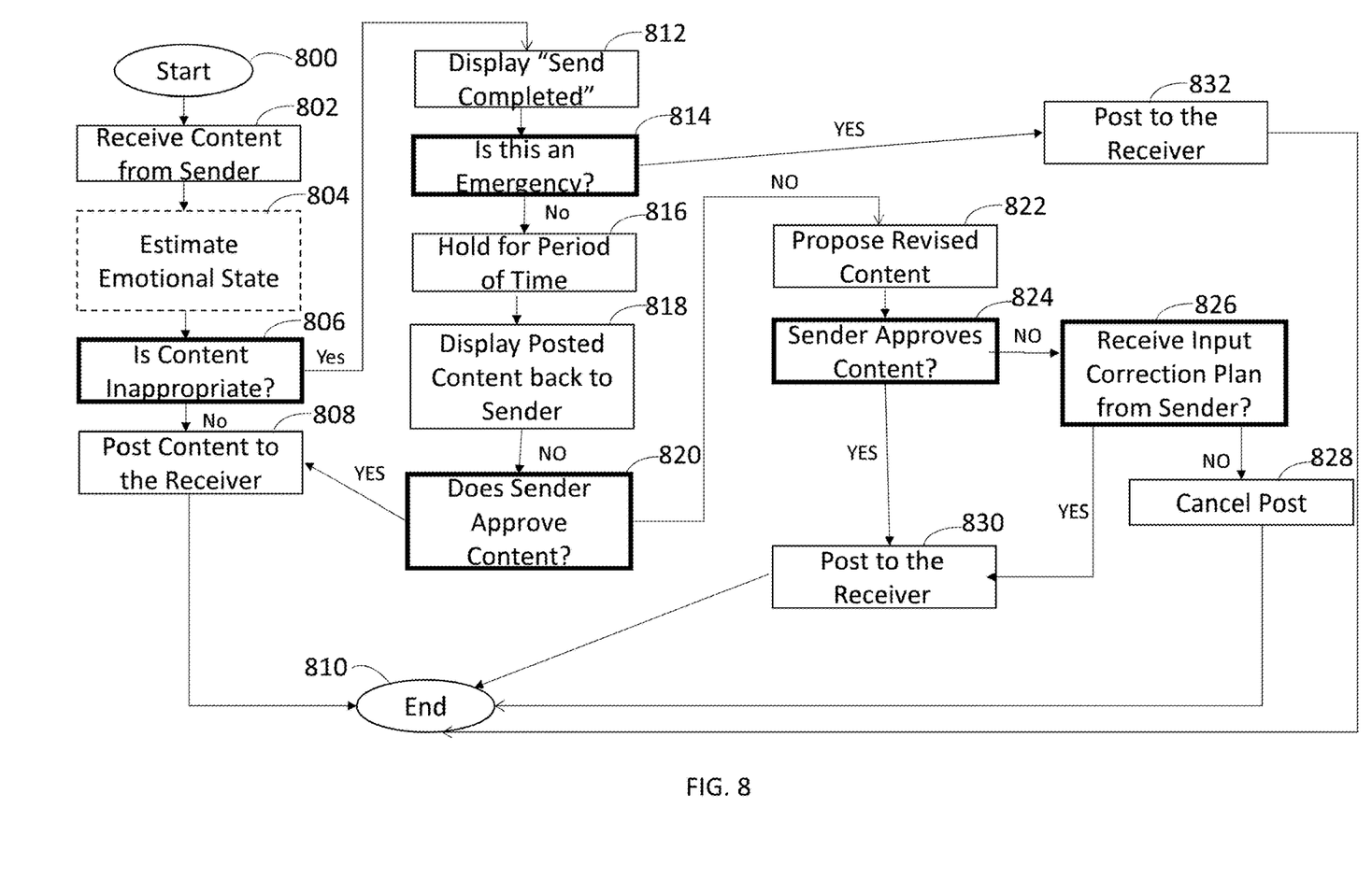
FIG. 8 is a schematic diagram of an illustrative flow chart showing processes for the content post delay system in accordance with one aspect of the present disclosure.

Turning to FIG. 8, a schematic diagram of an illustrative flow chart showing processes for the content post delay system 202 in accordance with one aspect of the present disclosure is provided. A number of different processes may be considered and are not limited to those shown. For example, providing a pass through for urgent content 102 or proposing revised content 502 may be left out. The processes may begin at block 800.

At block 802, the content post delay system 202 may receive content 102 from the sender 104 for processing. While the content 102 is shown as being processed on the system 202, it may also be evaluated on the sender device 104, alone or in combination with the system 202. The content 102 may be in the form of text messages or emails.

At optional block 804, the content post delay system 202 may determine the sender's emotional state as described above. The emotional state of the sender 104 may be used alone or in combination with the content 102 that is being sent to determine whether the content is inappropriate. For purposes of illustration, the emotional state may be taken off the camera of the sender device 106 while the sender 104 is drafting the content 102. When the sender 104 is angry, this information may be determined by the sender device 106 and provided to the system 202. Alternatively, data from the sender device 106 may be provided to the system 202 where it may determine the emotional state of the sender 106. Other biometric information may be taken from the sender device 106 to determine the emotional state of the sender 106 such as perspiration or shaking of the sender device 106.

At decision block 806, the content post delay system 202 may determine whether the content 102 is inappropriate. This may use the emotional state that was previously determined. In one example, if the emotional state of the sender 104 is angry, the system 202 may hold all content from being sent regardless of the content 102. In the alternative, the emotional state may be used to judge the content 102 that has been sent. For example, if the sender 106 was determined to be angry, but does not provide any inappropriate content, the content 102 may be more closely inspected.

The content post delay system 202 may also judge whether the content 102 is inappropriate without the use of the emotional state. Rather, the incoming content 102 from the sender device 106 may be judged by itself. Keyword matches may be used, the speed at which the content 102 was entered or the like may be used to determine whether the content 102 is inappropriate.

When the content is appropriate, the content 102 may be posted to the receiver device 110 at block 808 and thus, the receiver 108 may be able to view the content 102. The processes may end at block 810. If, however, the content 102 is inappropriate, the content post delay system 202 may provide to the sender device 106 a "Send Completed" message at block 812. By doing this, the sender 106 may believe that the content 102 went through.

At decision block 814, the content post delay system 202 may determine whether the content 102 is urgent or there is an emergency. The emotional state of the sender 104 may be taken as an indicator of the urgency of the content 102, for example, if the sender 104 is stressed. The content 102 may be determined to be an emergency by looking at the content 102 and whether there are any keywords that would indicate such a situation. If the content 102 is determined to show that there is urgency or the emotional state of the sender 104 is stressed, at block 832, the system 202 may post the content 102 to the receiver 108. The processes may end at block 810.

If, however, there is no emergency, at block 816, the content post delay system 202 may hold the content 102 for the period of time. This period of time may be a predefined time of thirty (30) seconds or may vary depending on the inappropriateness of the content 102, the emotional state of the sender 106 or a combination thereof.

At block 818, and after the period of time has elapsed, the posted content 102 may be provided back to the sender 104. The content 102 may be held on the content post delay system 202 for the period of time, however, it may also be held on the sender device 106 but not redisplayed until the period of time has passed. The content 102 may be reinserted into the message generation portion of the messaging application. This may automatically pull off the "Send Completed" message that was displayed earlier and bring the message back to the message composition area.

At decision block 820, the sender 104 may approve or disapprove the previously posted content 102. If the content 102 is approved, the content 102 may be posted to the receiver device 110 at block 808 and thus, the receiver 108 may view the content 102 that was originally sent. The processes may end at block 810.

If, however, the content 102 is not approved by the sender 104, the content post delay system 202 may propose revised content 502 to the sender 104 at block 822. The proposed content may be automatically generated using the neural network or other sentence constructions.

At decision block 824, the content post delay system 202 may determine whether the sender approves the revised content 502. Typically, the revised content 502 may tone down the language or remove those keywords that may cause conflict between the sender 104 and the receiver 108. If the sender 104 approves the revised content 502, the content 502 may be posted to the receiver at block 830. The processes may end at block 810.

If the sender 104 does not approve the revised content 502, the content post delay system 202 may receive an input correction plan from the sender 104 at block 826. That is, the sender 104 may provide, or edit, the content 102 within their original post. The original content 102 may be displayed on the sender device 106 in their messaging application. The content 102 may be edited through their message editing screen on the sender device 106. If the sender 106 provides a correction plan, then it may be posted to the receiver 108 through their receiver device 110 at block 830. The processes may end at block 810.

If, however, the sender does not have a correction plan or does not intend to post the original content 102, the post may be cancelled at block 828. The sender 104 may simply no longer want to post the content 102 after the period of time has elapsed since they may have cooled off at this point. The processes may end at block 810.

In one embodiment, each time new content 102 is provided, the content post delay system 202 may evaluate the content 102 and hold it if the content 102 if it is inappropriate. The system 202 may then manage line by line if sent through an email or text messaging application. Alternatively, if the sender 106 repeatedly approves content 102 after the delay for a predetermined number of messages, such as three (3) messages, then the system 202 would not hold the content 102 after the third message. The system 202 may also not propose revised content 502 if the sender 104 never accepts it. Other configuration may exist and these should not be construed as limiting.

Figure 9:
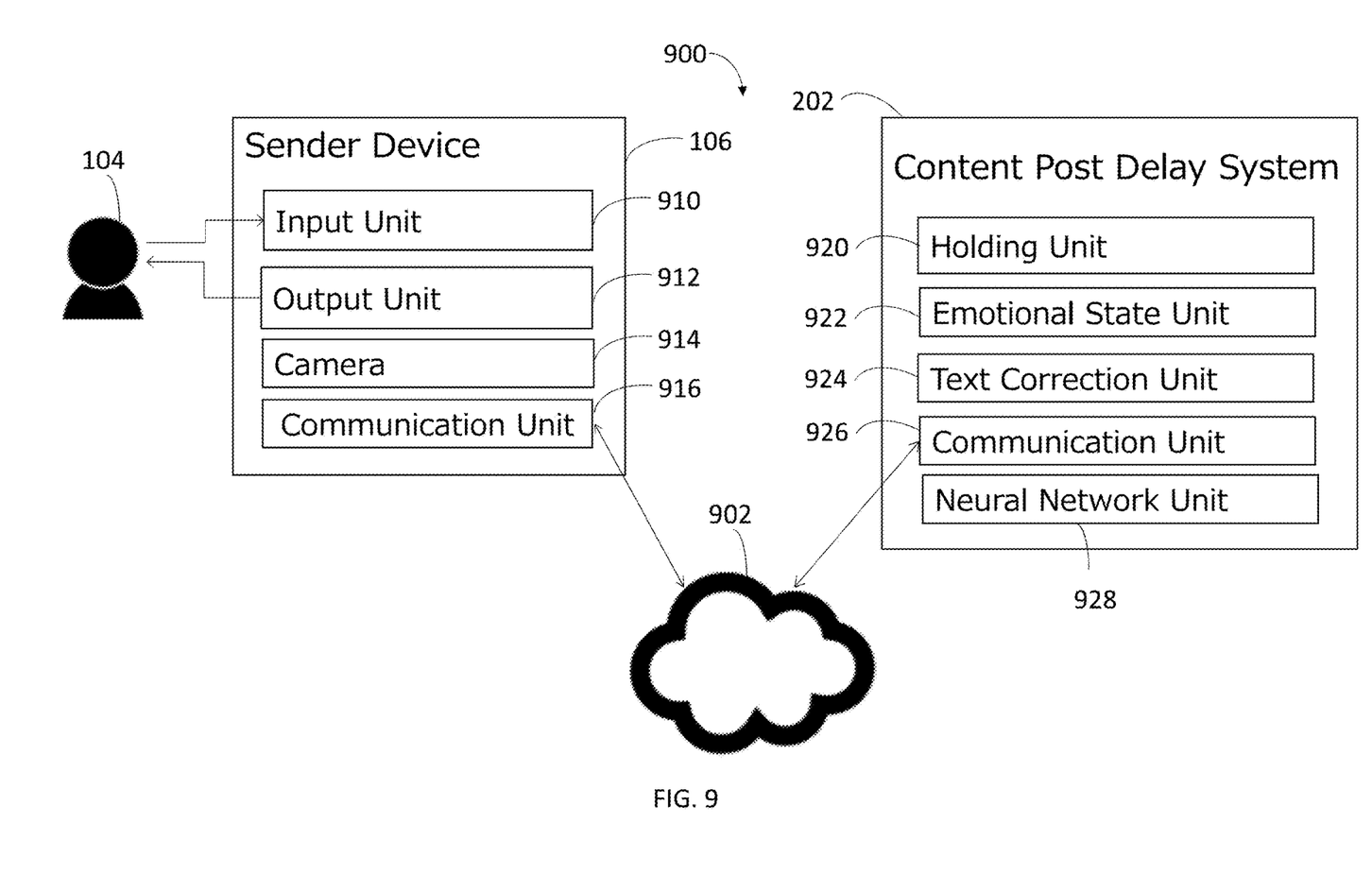
FIG. 9 is a schematic diagram of an illustrative scenario where the content post delay system is used in accordance with one aspect of the present disclosure.

FIG. 9 is a schematic diagram of an illustrative scenario 900 where the content post delay system 202 is used in accordance with one aspect of the present disclosure. While not shown, the receiver device 110 may include similar components to those on the sender device 106. The sender 104 may interact with the sender device 106. The sender device 106 may include, but is not limited to, a processor for implementing logic, memory, at least one input unit 910, at least one output unit 912, a camera 914 and a communication unit 916.

On the sender device 106, RAM and ROM may be used to support the program codes that are operated by the processor. The memory may be in a form of a hard disk, CD ROM, or equivalent storage medium. In software implementations, computer software and/or data is stored on a machine readable medium as part of a computer program product, and may be loaded into a computer system or other device or machine via a removable storage drive, hard drive, or communications interface. Computer programs, may be stored in a main and/or secondary memory, and executed by one or more processors, controllers, or the like to cause the one or more processors to perform the functions of the invention as described herein.

The input unit 910 on the sender device 106 may interact with the sender 104 and generate input data to control an operation of the sender device 106. The input unit 910 may include, but is not limited to, a keypad, a dome switch, a touch pad (pressure/capacitance), a jog wheel, a jog switch or the like. The input unit 910 may also include a microphone that receives an external audio signal in a phone call mode, a recording mode, a voice recognition mode or the like. The audio signal may be processed into electrical voice data. The microphone may implement various types of noise canceling algorithms to cancel noise generated in a procedure of receiving the external audio signal.

As shown, the sender device 106 may include the output unit 912. The output unit 912 may generate an output associated with visual sense, auditory sense or tactile sense and may include a display, an audio output, an alarm, a haptic unit or the like. Typical sender devices 106 may incorporate the input unit 910 into the output unit 912. That is, for example, the touch pad may both be an input unit 910 and an output unit 912.

The sender device 106 may include the camera 914 that may be used to detect the emotional state of the sender 104, as well as provide a number of other functions for the sender device 106. The camera 914 may process image frames, such as still or moving images, obtained by an image sensor in a video phone call or text capturing mode. The processed image frame may be analyzed for emotions provided by the sender 104, as described above.

The communication unit 916 on the sender device 104 may include one or more units allowing radio communications between the sender device 104 and a wireless communication system, or allowing radio communication between the sender device 104 and a network 902 in which the sender device 104 is located. For example, the communication unit 916 may include at least one of a broadcast receiver, a mobile communication unit, a wireless Internet unit, a short-range communication unit, a location information unit or the like.

The sender device 104 and the content post delay system 202 may communicate with a network 902. The network 902 may include, for example, a local-area network (LAN), the Internet, intranet, wide-area network (WAN), personal-area network (PAN), campus-area network (CAN), metropolitan area network (MAN), global-area network (GAN), virtual private network, or any other type of network supporting communication between devices described herein. The network 902 may include both wired and wireless connections, including optical links. Data and other information may be distributed from the sender device 104 to and from the system 202. Those skilled in the relevant art will appreciate that other types of networks may be used.

Continuing, the content post delay system 202, may interact as shown above to hold or pass through the content 102 that may be generated by the sender device 104. The system 202 may operate on a traditional server or web server. The server may include an operating system and software instructions, ROM, RAM, at least one processor, a network interface and data storage. The server may process requests from the sender device 106 or any other component. The server may typically handle high volumes of transactions and large amount of queries for communication and data processing. RAM and ROM may be used to support the program codes that are operated by the processor. The memory may be in a form of a hard disk, CD ROM, or equivalent storage medium. The processor may support the authentications such as communications from external data servers, as well as allowing for anonymous transactions and general data encryption.

The data storage may include hard disk magnetic or optical storage units, as well as CD ROM, CD RW or DVD ROM and flash memory such as compact flash and secure digital cards. The data storage contains databases used in the processing of transactions as well as storing details about the content 102 that is provided between sender devices 106 and receiver devices 110. That is, the server for the content post delay system 202 may store information about the content 102 and from who and where the content 102 is supposed to be from and where it is to go. The data storage may also include the dictionary 302 to match keywords found in the content 102.

The content post delay system 202 may include a holding unit 920. The holding unit 920, as described above, may hold onto the content 102 from being sent to the receiver 108 when the content 102 has been flagged or marked due to the inappropriateness of the content 102. The system 202 may also provide back to the sender device 106 a "Sending Complete" message to provide to the sender 104 that the content 102 has been sent but in actuality, it has not. The holding unit 920 of the system 202 may then create the false perception that the content 102 has been sent.

The unit 920 may also provide the delay for the period of time such that the sender 104 may regret sending the content 102. This period of time, as described above, may be predetermined or varying. The holding unit 920, after the period of time, may provide the content 102 back to sender device 106.

An emotional state unit 922 within the content post delay system 202 may also be used. That is, the unit 922 may determine the emotional state of the sender 104 to determine whether the content 102 being sent by the sender 104 is inappropriate. This may be directly received from the sender device 106 in the form of frames captures from the camera 914. Keywords or context of the conversations between the sender 104 and the receiver 108 may be used to determine the emotional state through the emotional state unit 922. Alternatively, the emotional state may be determined on the sender device 106, or a combination of the sender device 106 and the emotional state unit 922.

On the content post delay system 202, there may be a text correction unit 924. This unit 924 may provide the ability to provide the revised content 502 which was described earlier. The revised content 502 may be determined and generated from the machine learning algorithm. Alternatively, keywords may be replaced in and out to tone down the content 102. Typically, the revised content 502 from the text correction unit 924 may be provided after the period of time has elapsed giving time for the sender 104 to calm down.

The content post delay system 202 may include a communication unit 926. Conventional Ethernet technology or internal or external modems may serve as the network interfaces for the communication unit 926 with the network 902. A cable or DSL modem may be used as a network interface. While the above embodiment describes a single computer system acting as the server for the system 202, the functionality may be distributed over multiple computing systems. The databases may also be distributed over a cloud computing environment known to those skilled in the relevant art. In one embodiment, the server may be configured in a distributed architecture, wherein the databases and processors are housed in separate units or locations.

In one embodiment, and as described above, the content post delay system 202 may include a neural network unit 928. The unit 928 may work with the text correction unit 924, but may itself be its own unit. The neural network unit 928 may provide for partial or whole sentence reconstruction when proposed to the sender 104. Words or sets of words within the content 104 may be evaluated and replaced through the neural network, which uses the training set for identification and replacement of these words or sets of words.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computing device, comprising:
   at least one processor; and
   a memory operatively coupled to the at least one processor, the memory storing program instructions that when executed by the at least one processor, causes the at least one processor to:
   receive content from a sender device;
   hold the content in the memory for a period of time when the content is inappropriate;
   display a sent complete message, associated with the content, on the sender device when the content is held at the computing device, wherein
      the sent complete message indicates that the content has been sent to a receiver device associated with a recipient of the content,
      the sent complete message is displayed without the content being sent to the receiver device,
      the held content is pending with the computing device and is not accessible for viewing at the receiver device when the sent complete message is displayed on the sender device, and
      the computing device that holds the content is different from the receiver device;
   display the content on the sender device for editing or approval after holding the content for the period of time and after the display of the sent complete message on the sender device; and
   send the content to the receiver device based on the editing or the approval of the content such that the content is accessible for viewing at the receiver device.

2. The computing device of claim 1, wherein the sender device comprises a camera, and wherein the at least one processor determines whether the content is inappropriate by detecting facial features through the camera.

3. The computing device of claim 1, wherein the at least one processor determines whether the content is inappropriate by keyword recognition or typing speed.

4. The computing device of claim 1, wherein the display of the content for the editing comprises providing revised content on the sender device after the display of the sent complete message on the sender device.

5. The computing device of claim 4, wherein the at least one processor replaces a first keyword in the content with a second keyword through a neural network to generate the revised content.

6. The computing device of claim 1, wherein the at least one processor removes the hold when the content is determined as urgent.

7. The computing device of claim 6, wherein the content is determined to be urgent by keyword recognition.

8. The computing device of claim 1, wherein the program instructions cause the at least one processor to determine that the content is urgent based on a speed of movement of the sender device from a first location to a second location.

9. The computing device of claim 1, wherein the program instructions further cause the at least one processor to determine the period of time for which the content is held based on at least one of:
   one or more keywords in the content, or
   an emotional state of a sender associated with the sender device.

10. The computing device of claim 1, wherein the sender device generates the content and holds the content for the period of time.

11. The computing device of claim 1, wherein
   the content is specific content, and
   the program instructions cause the processor to:
      determine previous content of the specific content; and
      hold the specific content in the memory for the period of time when the previous content is inappropriate.

12. A method of preventing content from being sent to a receiver device from a sender device, the method comprising:
   in a message server that includes a memory:
      receiving content from the sender device;
      holding the content in the memory for a period of time when the content is inappropriate;
      providing to the sender device a sent message confirmation, associated with the content, when the content is held at the message server, wherein
         the sent message confirmation indicates that the content has been sent to the receiver device associated with a recipient of the content,
         the sent message confirmation is provided to the sender device without the content being sent to the receiver device,
         the held content is pending with the message server and is not accessible for viewing at the receiver device when the sent message confirmation is provided to the sender device, and
         the message server that holds the content is different from the receiver device;
      providing to the sender device the content for editing or approval after holding the content for the period of time and after the sent message confirmation is provided to the sender device; and
      sending the content to the receiver device based on the editing or the approval of the content such that the content is accessible for viewing at the receiver device.

13. The method of claim 12, wherein the receiving of the content from the sender device comprises receiving voice or text communications from the sender device.

14. The method of claim 12, further comprising matching keywords within the content along with speed at which the content is received to determine whether the content is inappropriate.

15. The method of claim 12, further comprising:
   receiving an emotional state from the sender device to determine whether the content is inappropriate, wherein the emotional state is based on one of a facial expression of a sender associated with the sender device or a movement of the sender device; and
   determining the period of time for which the content is held based on the emotional state of the sender.

16. The method of claim 12, further comprising removing the hold from the content when the content is urgent.

17. The method of claim 16, wherein the content is determined to be urgent based on a speed at which the content is entered and keywords within the content.

18. The method of claim 12, further comprising sending revised content to the sender device.

19. The method of claim 18, further comprising replacing words or whole sentences within the content.

20. The method of claim 12, further comprising extending the period of time, for holding the content, based on the content.

21. A system, comprising:
   a sender device to provide content; and
   a message server to:
      receive the content;
      hold the content for a period of time when the content is inappropriate;
      provide a sent complete message, associated with the content, to the sender device when the content is held at the message server, wherein
         the sent complete message indicates that the content received from the sender device has been sent to a receiver device associated with a recipient of the content,
         the sent complete message is provided to the sender device without the content being sent to the receiver device,
         the held content is pending with the message server and is not accessible for viewing at the receiver device when the sent complete message is provided to the sender device, and
         the message server that holds the content is different from the receiver device;
      send the content back to the sender device for editing after holding the content for the period of time and after display of the sent complete message on the sender device;
      remove the displayed sent complete message associated with the content on the sender device after the content is sent for the editing to the sender device;
      request the sender device to approve the content based on the content that is sent for the editing to the sender device and the removal of the displayed sent complete message; and
      send the content to the receiver device based on the approval of the content such that the content is accessible for viewing at the receiver device.

22. The system of claim 21, wherein the content is sent if urgent.

* * * * *